(12) United States Patent
Ravat

(10) Patent No.: US 6,983,782 B2
(45) Date of Patent: Jan. 10, 2006

(54) ASSEMBLY DRUM FOR THE MANUFACTURE OF TIRES

(75) Inventor: Stephane Ravat, Clermont-Ferrand (FR)

(73) Assignee: Michelin Recherche et Technique S.A., (CH)

(*) Notice: Subject to any disclaimer, the term of this patent is extended or adjusted under 35 U.S.C. 154(b) by 0 days.

(21) Appl. No.: 10/424,020

(22) Filed: Apr. 25, 2003

(65) Prior Publication Data

US 2004/0011470 A1   Jan. 22, 2004

Related U.S. Application Data

(63) Continuation of application No. PCT/EP01/12453, filed on Oct. 26, 2001.

(30) Foreign Application Priority Data

Oct. 27, 2000   (FR) .................................. 00 13888

(51) Int. Cl.
  *B29D 30/24*   (2006.01)
(52) U.S. Cl. ..................... 156/401; 156/415; 156/417
(58) Field of Classification Search ................ 156/132, 156/400–402, 414, 417, 415, 421.4
See application file for complete search history.

(56) References Cited

U.S. PATENT DOCUMENTS

| 3,016,321 | A | * | 1/1962 | Beckadolph et al. ....... 156/402 |
| 3,418,192 | A | * | 12/1968 | Nadler ....................... 156/401 |
| 4,470,867 | A | | 9/1984 | Carretta et al. |
| 5,301,728 | A | * | 4/1994 | Brown et al. .......... 152/209.14 |
| 6,250,356 | B1 | | 6/2001 | Cordaillat et al. |
| 6,506,274 | B1 | * | 1/2003 | Evangelista et al. ........ 156/132 |

FOREIGN PATENT DOCUMENTS

| DE | 1 729 606 B | 5/1972 |
| EP | 0 953 434 A1 | 11/1999 |

OTHER PUBLICATIONS

International Search Report PCT/EP01/12453, completed Feb. 11, 2002.

* cited by examiner

*Primary Examiner*—Geoffrey L. Knable
(74) *Attorney, Agent, or Firm*—E. Martin Remick; Adam Arnold

(57) ABSTRACT

The invention relates to a radially expandable assembly drum (1) for the manufacture of tires, said drum having a body mounted on a central shaft (2) having a generally cylindrical central surface for receiving the products to be assembled and ends of different diameters, the drum comprising a lifting device (20, 21) located at each end of the body of the drum having a cylindrical outer receiving surface (221, 231) for products to be assembled, characterized in that the lifting device (21) arranged close to the end of lesser diameter is radially displaceable relative to the body (10) of the drum (1) between a position wherein its surface (231) has substantially the same diameter as that of the central surface of the body (10) and a position wherein its surface (231) has a diameter less than that of the central surface of the body (10), the radial displacement of this lifting device (21) being synchronized with the radial expansion of the drum (1).

9 Claims, 2 Drawing Sheets

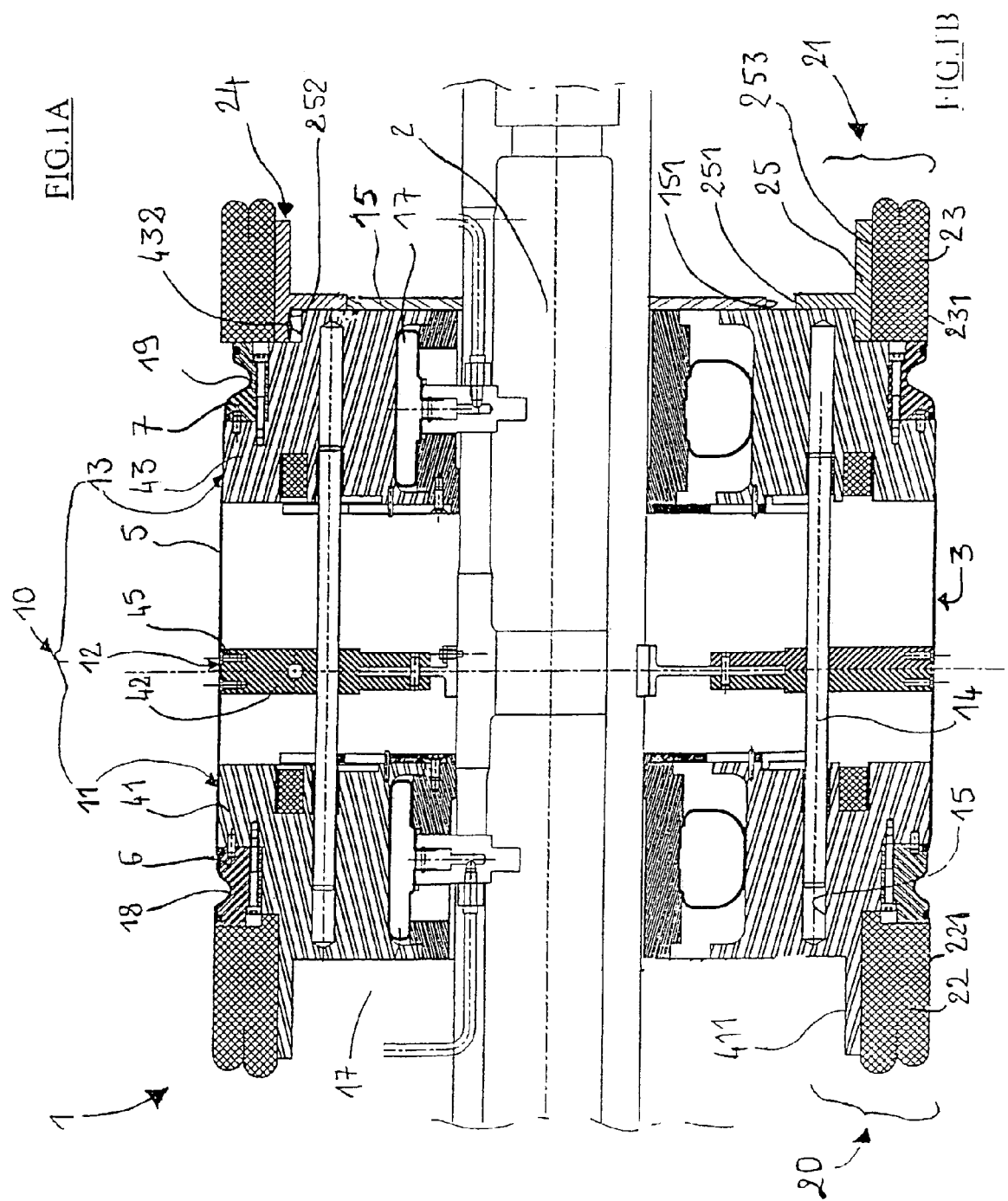

ASSEMBLY DRUM FOR THE MANUFACTURE OF TIRES

CROSS-REFERENCE TO RELATED APPLICATIONS

This application is a continuation of International Application No. PCT/EP01/12453, filed Oct. 26, 2001 and published May 2, 2002 in French as International Publication No. WO 02/34501 A1, and further claims priority to French Application No. 00/13888, filed 27, Oct. 2000.

BACKGROUND OF THE INVENTION

The present invention relates to a radially expandable assembly drum for the manufacture of tires. The invention relates more particularly to the manufacture of tires comprising a carcass reinforcement, two beads having different diameters, and at least one reinforcing bead wire in each of the beads of the tire within which the carcass reinforcement forms a turnup. However, the invention may also apply to the manufacture of tires which do not have a bead wire but where the beads have different diameters.

It is clear that the production of this type of tire requires the use of an assembly drum which has reception sites for the beads of tires of different diameter. However, this inequality of the diameter of the reception sites causes problems in industrial practice and inadequacies in terms of quality and reliability of the tires so obtained.

In fact, it is important for the quality and reliability of the tire to lay the products constituting the carcass reinforcement, such as plies etc., on the drum in a regular manner both in terms of geometry (centering) and tension in the products. This appears particularly difficult on a drum where the diameters of the reception sites for the beads are different. However, it can be imagined that these difficulties can be overcome by laying the various products by hand slowly and carefully. It is clear that this solution cannot be adapted to an industrial context. Furthermore, the production of the uptum of the carcass reinforcement in the beads of the tire requires tensioning of the carcass reinforcement at the points around which the rotation of said reinforcement will take place, which creates additional difficulties.

Publication EP-0 953 434 describes an assembly drum for manufacturing tires having beads of different diameters. This drum comprises at its ends grooves for receiving the beads, of different diameter and a retractable hoop intended to cover the groove of lesser diameter to present a cylindrical surface for laying the products constituting the carcass reinforcement. Lifting devices located close to the grooves make it possible to turn up the carcass reinforcement when the hoop is in the retracted position. This assembly drum effectively permits production of tires having beads of different diameters; however, the presence of the hoop requires precise adjustment to ensure proper centering relative to the drum, also increases the bulk in particular in terms of length of the latter, making it less accessible, and makes the drum far more mechanically complex.

SUMMARY OF THE INVENTION

The invention therefore relates to a simpler assembly drum which makes it possible to manufacture tires having beads of different diameters.

According to the invention, the radially expandable assembly drum, having a body mounted on a central shaft having a generally cylindrical central surface for receiving the products to be assembled and having ends of different diameters, comprising a lifting device located at each end of the body of the drum having a cylindrical outer receiving surface for products to be assembled, is characterized in that the lifting device arranged close to the end of lesser diameter is radially displaceable relative to the body of the drum between a position wherein its surface has substantially the same diameter as that of the central surface of the body and a position wherein its surface has a diameter less than that of the central surface of the body, the radial displacement of this lifting device being synchronized with the radial expansion of the drum. This structure makes it possible to effect flat laying of the products such as the carcass reinforcement, that is to say, on a cylindrical surface, but to effect a turnup of the ends of the carcass reinforcement to produce each bead, in correspondence with the diameter of the end of the drum, the lifting device being to some extent adjustable to this diameter.

According to one characteristic of the invention, the radial displacement of the radially displaceable lifting device is automatically controlled by the radial expansion of the drum. This automatic control makes it possible to avoid having other control elements for the displacement of the lifting device to be synchronized with the operation of the drum.

Advantageously, the radially displaceable lifting device comprises a first bearing surface intended to cooperate with a first stop carried by the drum and fastened radially relative to the central shaft, and a second bearing surface intended to cooperate with a second stop carried by the body and integral radially with the latter, such that each of the two radial positions of the device relative to the body of the drum corresponds to the contact of one of the two stops with the corresponding bearing surface of the device. This simple configuration makes it possible to achieve the desired control.

BRIEF DESCRIPTION OF THE SEVERAL VIEWS OF THE DRAWINGS

Other characteristics and advantages of the invention will become apparent on reading an example of embodiment of an assembly drum according to the invention with reference to the appended drawing, in which:

FIGS. 1A and 1B are axial sections through the drum according to the invention in the retracted position of the drum and in the expanded position thereof, respectively.

DETAILED DESCRIPTION OF THE INVENTION

Figure 2A:
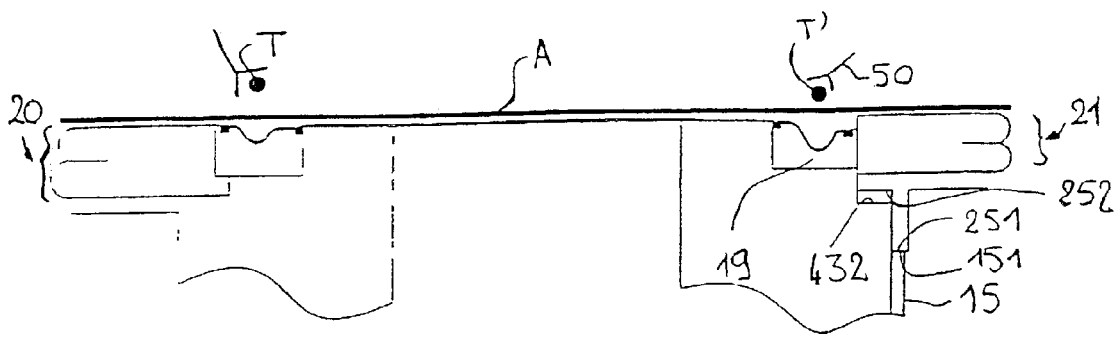
FIGS. 2A to 2E are diagrams in partial axial section through the assembly drum illustrating the different phases of the manufacture of a tire according to the invention.

In FIGS. 1A and 1B, the radially expandable assembly drum 1 comprises a body 10 mounted on a central shaft 2 and having a receiving surface 3 for the products to be assembled. The body 10 comprises two half-cylinders 11 and 13 which are axially displaceable about the central shaft 2 in order to adjust the spacing of the bead wires of the tire to be produced, the two half-cylinders 11 and 13 being separated by a central crown 12 fixed axially relative to the central shaft 2. The half-cylinders 11 and 13 and also the crown 12 are formed by a plurality of segments 41, 43 and 42 respectively, which are juxtaposed circumferentially around the central shaft 2, the segments 41, 42 and 43 being aligned. To ensure co-ordination of the body 10, each of the segments 41 and 43 is connected to the opposing segment 42 by means of a rod 14 which passes through the segment 42, and the ends of which are mounted to slide respectively in bores 15 carried by the segments 41 and 43.

In order to enable the drum 1 to achieve its expanded position, the segments 41, 42, 43 are radially mobile under the action of two expansion chambers 17 arranged respectively beneath said segments 41 and 43, these chambers being inflatable. The segments 41 and 43 drive in their radial movement the segments 42 of the crown 12 by means of the rods 14.

Plates 5 are fixed by screws 45 on the segments 42 of the crown 12. These plates 5 cover at least in part the segments 41 and 43 in order to provide continuity between the crown 12 and the half-cylinders 11 and 13 for the products to be assembled, whatever the axial position of the half-cylinders. The crown 12 furthermore makes it possible to ensure axial holding of the plates 5 upon the radial expansion of the drum 1.

The lateral ends of segments 41 and 43 carry support elements 6 and 7, respectively, having receiving grooves 18 and 19 for the bead wires of the tire. These receiving grooves 18 and 19 have different diameters, the groove 19 having the smaller diameter in this example, which makes it possible to produce an asymmetrical tire, that is to say, one wherein the two beads have different diameters. It can equally well be envisioned that the support elements 6 and 7 are attached to the segments 41 and 43 or that the support elements form part of said segments. The drum 1 has a lifting device 20, 21 at each of the axial ends of the drum 1 arranged axially externally relative to the center of the drum 1 and at a short distance therefrom or juxtaposed at each receiving groove 18 or 19, respectively. The lifting devices also have a bearing surface 221 and 231 for the products to be assembled.

The receiving surface 3 for the products to be assembled is thus formed by all the external surfaces of the plates 5 forming the central surface of the body 10, zones of the segments 41 and 43 not covered by said plates and bearing surfaces 221 and 231.

The lifting device 20 arranged close to the groove 18 of greater diameter comprises turn-up bladders 22 which are carried directly by an axial extension 411 of the segments 41. The device 20 is integral with the drum 1 upon the radial expansion of the latter. The lifting device 21 also comprises turn-up bladders 23, but the latter are carried by a cylindrical support element 24, the support 24 being formed by a plurality of segments 25 which cooperate respectively with the segments 43.

Each segment 25 has a first bearing surface 251 intended to cooperate with a first stop carried by the drum 1 fixed radially relative to the central shaft 2, and each segment 25 has a second bearing surface 252 intended to cooperate with a second stop carried by the corresponding segment 43.

In accordance with the variant embodiment of the invention shown in FIGS. 1A and 1B, the segments 25 have a T-shaped axial section, where the free end of the trunk of the T of corresponding to the free end of each segment 25 bears the first bearing surface 251. The face of the axial bar of the T which is radially inner relative to the center of the drum constitutes the second bearing surface 252. The face 253 of each segment 25, axially to the outside relative to the center of the drum 1 and corresponding to the axial bar of the T, supports the turn-up bladders 23.

The first stops cooperating with the first bearing surfaces 251 are formed by the radially outer surfaces 151 of an element 15 which is centered and fixed to the central shaft 2 such that it is integral with the latter. This element 15 may or may not be placed next to the axially outer ends of the segments 43. This element may be produced in the form of a disc as shown in the figures or in any other form which makes it possible to obtain an outer surface capable of cooperating with the T-shaped end of the segments 25 such as, for example, fingers distributed around the central shaft 2, each finger being intended to cooperate with a segment 25. The second stop is formed by a shoulder 432 carried by each segment 43. It is obvious, even if this variant is not shown in the figures, that a system for adjusting the stop 432 may be provided. It is obvious that for a different shape of the segments 25, the stops corresponding to the bearing surfaces will also have different arrangements while remaining respectively integral with the central shaft and each segment 43.

For each segment 25, the bearing surfaces are made such that:
in the retracted position of the drum 1 and with the expansion chambers 17 deflated, the surfaces 251 of the segment 25 and 151 of the disc 15 are in contact,
In the expanded position of the drum 1 and with the expansion chambers 17 inflated: the surface 252 of the segment 25 and the shoulder 432 of the segment 43 are in contact.

Thus, the radial displacement of the lifting device 21 is automatically controlled by the radial expansion of the drum, as will be seen in greater detail in the description of the operation which follows. It may be sufficient to synchronize these two movements by separately controlling the radial displacement of the lifting device 21; however, this solution is mechanically more complex.

There will be described hereafter, with reference to FIGS. 2A to 2E, the process for manufacturing a tire comprising a carcass reinforcement A, two beads of different diameters comprising at least one reinforcing bead wire, T and T' respectively. What is of interest here is the phase corresponding to the placement of the bead wires T and T', without taking into account the positioning of the other constituent products of the tire carcass, which do not correspond to the subject of the invention.

The very schematic apparatus shown in the figures which permits implementation of the process comprises in particular the drum 1 and bead-wire guides 50 which are displaceable axially and coaxially to the central shaft 2. These bead-wire guides 50 comprise respectively a ring for transferring a bead wire using grippers distributed over its circumference which provide concentric holding of the bead wire relative to the drum 1.

In FIG. 2A, the drum 1 is shown in the retracted position:
the expansion chambers 17 are deflated,
the surface 231 of the turn-up bladders 23 has the same diameter as that corresponding to the central surface of the body 10,
the surfaces 251 of the segments 25 and 151 of the disc 15 are in contact, whereas the surfaces 252 are spaced radially from the shoulders 432.

As can also be seen in FIG. 2A, the carcass reinforcement A has been laid on this planar surface 3.

The bead-wire guides 50 carrying the bead wires T and T' are then advanced axially towards the carcass reinforcement A until they reach their axial position relative to the drum 1, that is to say, each above one of the grooves 18, 19. These bead wires T and T' are moved without undergoing any particular stress, and consequently the radial distance between each bead wire and the bottom of the corresponding groove is identical for the two bead wires in this example.

Figure 2B:
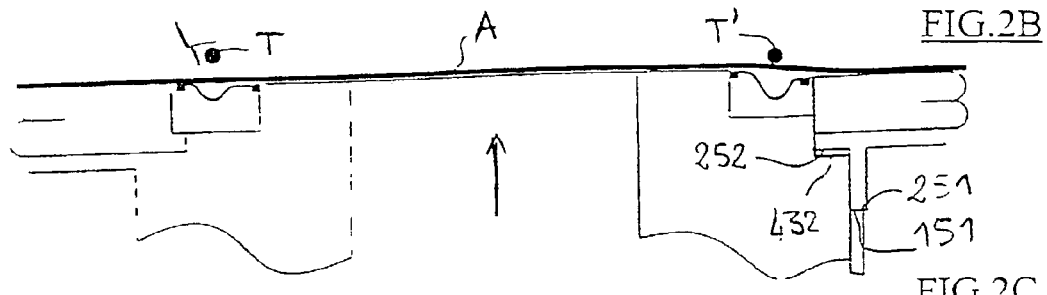

Then inflation of the expansion chambers 17 commences. When the bead wire T' of smaller diameter is in contact with the carcass reinforcement, the bead-wire guide holding the bead wire T' is removed while continuing inflation of the expansion chambers 17 as can be seen in FIG. 2B. The bead-wire guide holding the bead wire T of larger diameter is removed in the same manner when it is in contact with the carcass reinforcement A. It is noted that although the surfaces 251 and 151 are still in contact, the distance between the surface 252 and the shoulder 432 has decreased.

Figure 2C:
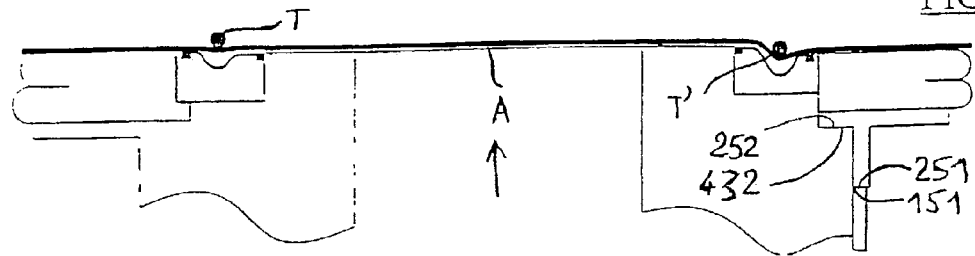

FIG. 2C shows the drum 1 partially expanded, the surfaces 252 coming into contact with the shoulders 432, the surfaces 251 and 151 still being in contact. The lifting device 21, which until this stage had remained radially fixed, then becomes integral with the drum 1 in its radial expansion.

Figure 2D:
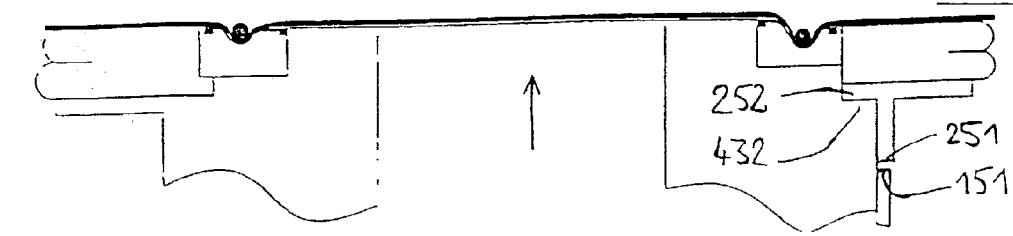

FIG. 2D shows the end of the inflation of the expansion chambers 17, the drum 1 has reached its expanded position, the two bead wires are each arranged in their grooves. The surfaces 252 are still in contact with the shoulders 432; on the other hand the surfaces 251 and 151 have moved apart radially from each other.

Figure 2E:
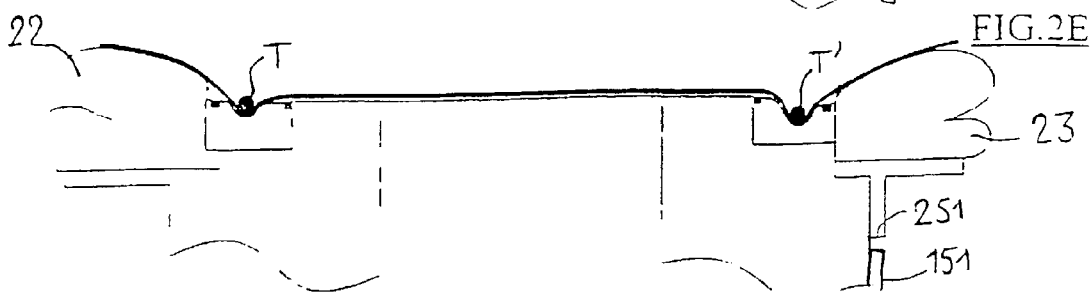

As shown in FIG. 2E, the inflation of the turn-up bladders 22 and 23 is then effected, these permitting turning-up of the ends of the carcass reinforcement A with a rotation of the latter about the bead wires T and T' and the other products, not shown here, constituting each bead.

Without departing from the scope of the invention, it is quite easy to conceive of elements other than the expansion chambers for effecting radial expansion of the drum, the operation of the lifting devices not being linked to the selection of expansion chambers.

Finally, the other constituent products of the tire are laid. The invention does not relate to this part of the manufacture. Numerous methods are available to the person skilled in the art; this is why there is no point in discussing this aspect of the manufacture in the context of the present invention. Note, however, that, in the case of a two-phase manufacturing process, side plates for taking up different diameters have to be provided on the second drum, referred to as the "finishing drum." The tire is vulcanized using a mould which must make allowance for the asymmetry of the tire.

What is claimed is:

1. A radially expandable assembly drum (1) for the manufacture of tires, said drum having a body mounted on a central shaft (2) having a substantially cylindrical central surface for receiving the products to be assembled and having ends of different diameters, said drum further comprising a lifting device (20, 21) located at each end of the body of said drum having a cylindrical outer receiving surface (221, 231) for products to be assembled, characterized in that said lifting device (21), arranged close to an end of lesser diameter, is radially displaceable relative to said body (10) of said drum (1) between a position wherein said receiving surface (231) has substantially the same diameter as that of said central surface of said body (10) and a position wherein said surface (231) has a diameter less that that of said central surface of said body (10), and wherein the radial displacement of said lifting device (21) is synchronized with the radial expansion of said drum (1), and wherein said radially displaceable lifting device (21) comprises at least one first bearing surface (251) intended to cooperate with a first stop (151) carried by said drum (1) and fastened radially relative to the central shaft (2), and at least one second bearing surface (252) intended to cooperate with a second stop (432) carried by and integral radially with said body (10), such that each of the two radial positions of said lifting device (21) relative to said body of said drum corresponds to a contact of one of said stops with said corresponding bearing surface of said lifting device.

2. The drum according to claim 1, wherein said second stop (432) carried by said drum is adjustable.

3. The drum according to claim 1, wherein said first stop (151) is carried by an element centered and fixed radially to said central shaft (2).

4. The drum according to claim 3, wherein said element is formed by a disc (15), the outer surface of which constitutes said first stop (151).

5. The drum according to claim 3, wherein said element is formed by a plurality of fingers distributed around the central shaft, and the radially outer surface relative to the center of said drum of each finger constitutes said first stop.

6. The drum according to claim 1, wherein said lifting device (21) is radially displaceable relative to said body (10) and comprises turn-up bladders (23) mounted fixedly on a radially expandable cylindrical support (24) having said first and second bearing surfaces (251, 252).

7. The drum according to claim 6, wherein said cylindrical support (24) is formed by a plurality of segments (25) distributed radially around the central shaft.

8. The drum according to claim 7, wherein each segment (25) has said first and second bearing surfaces (251, 252).

9. The drum according to claim 8, wherein said segments (25) comprising said cylindrical support (24) have a T-shaped section.

* * * * *